(12) United States Patent
Szor

(10) Patent No.: US 7,418,729 B2
(45) Date of Patent: Aug. 26, 2008

(54) HEURISTIC DETECTION OF MALICIOUS COMPUTER CODE BY PAGE TRACKING

(75) Inventor: Peter Szor, Santa Monica, CA (US)

(73) Assignee: Symantec Corporation, Cupertino, CA (US)

( * ) Notice: Subject to any disclaimer, the term of this patent is extended or adjusted under 35 U.S.C. 154(b) by 770 days.

(21) Appl. No.: 10/264,922

(22) Filed: Oct. 4, 2002

(65) Prior Publication Data

US 2004/0015712 A1 Jan. 22, 2004

Related U.S. Application Data

(60) Provisional application No. 60/397,159, filed on Jul. 19, 2002.

(51) Int. Cl.
*G06F 12/16* (2006.01)

(52) U.S. Cl. .......................... 726/22; 726/24

(58) Field of Classification Search ............... None
See application file for complete search history.

(56) References Cited

U.S. PATENT DOCUMENTS

| | | | |
|---|---|---|---|
| 5,278,901 A | 1/1994 | Shieh et al. |
| 5,398,196 A | 3/1995 | Chambers |
| 5,440,723 A | 8/1995 | Arnold et al. |
| 5,452,442 A | 9/1995 | Kephart |
| 5,473,769 A | 12/1995 | Cozza |
| 5,572,590 A | 11/1996 | Chess |
| 5,684,875 A | 11/1997 | Ellenberger |
| 5,696,822 A | 12/1997 | Nachenberg |
| 5,715,174 A | 2/1998 | Cotichini et al. |
| 5,715,464 A | 2/1998 | Crump et al. |
| 5,758,359 A | 5/1998 | Saxon |
| 5,812,763 A | 9/1998 | Teng |
| 5,889,943 A | 3/1999 | Ji et al. |
| 5,951,698 A | 9/1999 | Chen et al. |
| 5,956,481 A | 9/1999 | Walsh et al. |
| 5,960,170 A | 9/1999 | Chen et al. |
| 5,978,917 A | 11/1999 | Chi |
| 5,987,610 A | 11/1999 | Franczek et al. |
| 5,991,881 A | 11/1999 | Conklin et al. |

(Continued)

FOREIGN PATENT DOCUMENTS

DE 100 21 686 A1 11/2001

(Continued)

OTHER PUBLICATIONS

Szor, P.; *Attacks on WIN32*, Virus Bulletin Conference, Oct. 1998, pp. 57-84.

(Continued)

*Primary Examiner*—Nasser Moazzami
*Assistant Examiner*—Brandon S Hoffman

(57) ABSTRACT

To detect a computer virus in a host file (100), an emulating module (414) emulates the host file (100) in a virtual machine (422) having a virtual memory (426). While emulating the host file (100), the system (400) tracks the host file's access of the virtual memory (426). Responsive to an access in a non-normal address range of the virtual memory (426) by the host file (100), a flag recording module (522) sets a flag. A virus reporting module (526) declares a potential virus based on whether the flag is set.

28 Claims, 6 Drawing Sheets

U.S. PATENT DOCUMENTS

| | | |
|---|---|---|
| 6,052,709 A | 4/2000 | Paul et al. |
| 6,070,244 A | 5/2000 | Orchier et al. |
| 6,072,830 A | 6/2000 | Proctor et al. |
| 6,088,803 A | 7/2000 | Tso et al. |
| 6,094,731 A | 7/2000 | Waldin et al. |
| 6,104,872 A | 8/2000 | Kubota et al. |
| 6,108,799 A | 8/2000 | Boulay et al. |
| 6,167,434 A | 12/2000 | Pang |
| 6,192,379 B1 | 2/2001 | Bekenn |
| 6,192,512 B1* | 2/2001 | Chess .................. 717/127 |
| 6,199,181 B1 | 3/2001 | Rechef et al. |
| 6,275,938 B1* | 8/2001 | Bond et al. ................ 726/23 |
| 6,338,141 B1 | 1/2002 | Wells |
| 6,357,008 B1 | 3/2002 | Nachenberg |
| 6,370,648 B1 | 4/2002 | Diep |
| 6,412,071 B1 | 6/2002 | Hollander et al. |
| 6,493,007 B1 | 12/2002 | Pang |
| 6,535,891 B1 | 3/2003 | Fisher et al. |
| 6,552,814 B2 | 4/2003 | Okimoto et al. |
| 6,611,925 B1 | 8/2003 | Spear |
| 6,622,150 B1 | 9/2003 | Kouznetsov et al. |
| 6,678,734 B1 | 1/2004 | Haatainen et al. |
| 6,697,950 B1 | 2/2004 | Ko |
| 6,721,721 B1 | 4/2004 | Bates et al. |
| 6,748,534 B1 | 6/2004 | Gryaznov et al. |
| 6,763,462 B1 | 7/2004 | Marsh |
| 6,766,458 B1 | 7/2004 | Harris et al. |
| 6,813,712 B1 | 11/2004 | Luke |
| 6,851,057 B1 | 2/2005 | Nachenberg |
| 6,910,134 B1 | 6/2005 | Maher et al. |
| 6,941,473 B2 | 9/2005 | Etoh et al. |
| 6,973,577 B1* | 12/2005 | Kouznetsov .................. 726/25 |
| 7,134,141 B2 | 11/2006 | Crosbie et al. |
| 7,213,260 B2 | 5/2007 | Judge |
| 7,301,899 B2 | 11/2007 | Goldstone |
| 2002/0004908 A1 | 1/2002 | Galea |
| 2002/0035696 A1 | 3/2002 | Thacker |
| 2002/0046275 A1 | 4/2002 | Crosbie et al. |
| 2002/0083175 A1 | 6/2002 | Afek et al. |
| 2002/0091940 A1 | 7/2002 | Wellborn et al. |
| 2002/0157008 A1 | 10/2002 | Radatti |
| 2002/0162015 A1 | 10/2002 | Tang |
| 2002/0178374 A1 | 11/2002 | Swimmer et al. |
| 2002/0188870 A1 | 12/2002 | Gong et al. |
| 2003/0014667 A1 | 1/2003 | Kolichtchak |
| 2003/0023865 A1 | 1/2003 | Cowie et al. |
| 2003/0051026 A1 | 3/2003 | Carter et al. |
| 2003/0065926 A1 | 4/2003 | Schultz et al. |
| 2003/0115485 A1 | 6/2003 | Milliken |
| 2003/0120951 A1 | 6/2003 | Gartside et al. |
| 2003/0126449 A1 | 7/2003 | Kelly et al. |
| 2003/0140049 A1 | 7/2003 | Radatti |
| 2003/0145232 A1 | 7/2003 | Poletto et al. |
| 2003/0191966 A1 | 10/2003 | Gleichauf |
| 2003/0212902 A1* | 11/2003 | van der Made ............ 713/200 |
| 2003/0236995 A1 | 12/2003 | Fretwell, Jr. |
| 2004/0015712 A1 | 1/2004 | Szor |
| 2004/0015726 A1 | 1/2004 | Szor |
| 2004/0030913 A1 | 2/2004 | Liang et al. |
| 2004/0158730 A1 | 8/2004 | Sarkar |
| 2004/0162808 A1 | 8/2004 | Margolus et al. |
| 2004/0181687 A1 | 9/2004 | Nachenberg et al. |
| 2005/0021740 A1 | 1/2005 | Bar et al. |
| 2005/0044406 A1 | 2/2005 | Stute |
| 2005/0132205 A1 | 6/2005 | Palliyil et al. |
| 2005/0177736 A1 | 8/2005 | De los Santos et al. |
| 2005/0204150 A1 | 9/2005 | Peikari |
| 2006/0064755 A1 | 3/2006 | Azadet et al. |

FOREIGN PATENT DOCUMENTS

| | | |
|---|---|---|
| EP | 1 280 039 A | 1/2003 |
| GB | 2 364 142 A | 1/2002 |
| WO | WO 97/39399 A | 10/1997 |
| WO | WO 01/91403 A | 11/2001 |
| WO | WO 02/05072 A | 1/2002 |

OTHER PUBLICATIONS

Szor, P.; Memory Scanning Under Windows NT, Virus Bulletin Conference, Sep. 1999, pp. 1-22.

Szor, P.; Attacks on WIN32—Part II, Virus Bulletin Conference, Sep. 2000, pp. 47-68.

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Von Babo, Michael, "Zehn Mythnum Computerviren: Dichtug Und Wahrheit Uber Den Schrecken Des Informatkzeitlers," *Technische Kundschau*, Hallwag, Bern CH vol. 84, No. 36. Sep. 4, 1992, pp. 44-47.

Delio, M., "Virus Throttle a Hopeful Defense", Wired News, Dec. 9, 2002, retrieved from the Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http://www.wackyb.co.nz/mesfp.html>.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36, Sep. 4, 1992, pp. 44-47.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

Wikipedia—"Thread (computer science)," Oct. 12, 2005, [online] [Retrieved on ] Retrieved from the Internet<URL:http://en.wikipedia.org/wiki/Thread_%28computer_science%29>.

* cited by examiner

HEURISTIC DETECTION OF MALICIOUS COMPUTER CODE BY PAGE TRACKING

RELATED APPLICATIONS

This application claims the priority benefit under 35 U.S.C. § 119(e) of commonly owned U.S. Provisional Patent Application Ser. No. 60/397,159, filed Jul. 19, 2002, which patent application is hereby incorporated in its entirety by reference into the present patent application.

TECHNICAL FIELD

This invention pertains to the field of detecting malicious code in computer systems, and in particular to detecting malicious code using a dynamic heuristic based on tracking access to suspicious pages or portions of a memory.

BACKGROUND ART

In May of 2002, the number of known 32-bit Windows viruses and worms exceeded 2000. Computer viruses, worms, and Trojan horses are types of "malicious code," which is herein defined as any computer program, module, set of modules, or code that enters a computer system without an authorized user's knowledge and/or without an authorized user's consent. In particular, a computer worm is malicious code that has the ability to replicate itself from one computer to another, e.g., over a computer network. Although the major problem for today's users is computer worms, simple file infector viruses persist and remain a challenge for anti-virus software. Distinguished from worms, computer viruses are characterized in that they typically attach to and/or modify a host program, which may be an executable, a dynamically linked library (DLL), or another kind of application. Examples of such viruses include the virus families W32. FunLove, W32. Bolzano, and W32. Coke.

To operate, malicious code usually has to call system APIs (application programming interfaces) from system libraries, such as KERNEL32. DLL in 32-bit WINDOWS systems. Normal computer programs access system APIs by static linking, which builds a proper import address table, or by calling the GetProcAddress( ) API to obtain dynamically the address of a particular API. An application that uses the GetProcAddress( ) API typically needs to have a static import to call that API. The static import for the GetProcAddress( ) API is located in the application's import address table, which thereby allows the application to call by name any APIs that are to be exported. Malicious code cannot typically call APIs like normal applications because malicious code typically does not have its own imports.

Accordingly, calling system APIs can be a challenge for writers of malicious code. For example, the Win95/Boza virus often failed to infect files as intended because it used hard-coded addresses to call particular system APIs more easily. Because API addresses often vary from one operating system (OS) to the next—and even among different releases of the same OS—malicious code that uses hard-coded API addresses does not spread well on different systems. To solve this problem, writers of malicious code have implemented functions for locating system APIs that are similar in their implementation to GetProcAddress( ). For example, the Win95/Marburg and Win32/Cabanas.A viruses both used a trick that has become a new standard in virus development. These viruses have a function that locates the address of each API they need to call under all Win32 systems. While a challenge for virus writers, this need to call system APIs can be exploited by writers of anti-virus tools.

The article, Ször, Péter, "Attacks on Win32," *Proceedings of the Virus Bulletin Conference*, October 1998, England, explains how heuristic analysis is helpful for detecting infections by malicious code. Heuristics are usually based on certain characteristics that distinguish malicious code from normal code, such as the malicious code's need to call system APIs as described above. One heuristic suggested in the "Attacks on Win32" article is to search for code in a target file that uses the KERNEL32 address directly and looks for the text string "PE00". This heuristic is premised on the idea that accessing the KERNEL32 library and searching for "PE00" is one way that malicious code can locate system APIs without having those addresses hard-coded, whereas normal applications do not need to perform this task because they have an import table. This technique is called a static heuristic because it is performed by scanning a particular file for certain structure characteristics common to particular types of malicious code. Static heuristic techniques have been extremely successful against early file viruses and other malicious code, and these heuristics continue to be useful against many species of malicious code today.

But programmers of malicious code are increasingly employing anti-heuristic techniques to hide the identifying features of malicious code infection in a file's structure. Many of these anti-heuristic techniques implement the same suspicious activity in different ways to obscure that activity from static heuristics techniques. For example, the static heuristic explained above could be defeated by encrypting the portion of the malicious code that looks for the text string "PE00". Ször, Péter, "Attacks on Win32—Part II," *Proceedings of the Virus Bulletin Conference*, September 2000, England, describes a variety of other anti-heuristic techniques used by malicious code to avoid detection by static heuristics. Accordingly, anti-virus software tools often employ emulation, in which a file is executed in an emulated environment. In this way, the anti-virus software can use heuristics that are based on actions that the executed file takes in the simulation, thus defeating the efforts of writers of malicious code to obscure the structure of their malicious code. Such techniques are referred to as dynamic heuristics. "Attacks on Win32 II" also describes various attacks by malicious code on computer systems, as well as static and dynamic heuristics and other techniques for detecting malicious code.

Apart from heuristics, the "Attacks on Win32 II" article additionally explains some of the incompatibility problems that caused older 32-bit viruses to fail to work on newer WINDOWS 2000 systems. For example, several 32-bit viruses call system APIs by searching for the loaded KERNEL32. DLL (and thus the APIs therein), and looking for the text "MZ" or "PE" within particular process address spaces. Because different versions and releases of WINDOWS use different base addresses for system libraries such as KERNEL32. DLL, viruses written for one release or type of OS will often fail to work on a different one. Viruses such as the WIN32/Cabana family do not pay attention to the moving DLL base address, and thus fail on some systems when attempting to locate the loaded system libraries. This paper, however, failed to recognize that incompatibility problems such as this one could themselves be used as a heuristic for detecting various types of malicious code.

As writers continue to develop malicious code, the need persists for additional reliable heuristics to detect computer viruses and other malicious code without generating a significant number of false positives.

DISCLOSURE OF INVENTION

The present invention comprises methods, apparati, and computer program products for detecting malicious code in a host file (100). In an embodiment of the invention, an emulating module (414) emulates the host file (100) in a virtual machine (422) having a virtual memory (426). While emulating the host file (100), the system (400) tracks the host file's access of the virtual memory (426). Responsive to an access in a non-normal address range of the virtual memory (426) by the host file (100), a flag recording module (522) sets a flag. A virus reporting module (526) declares a potential malicious code based on whether the flag is set. This technique can be used with additional heuristics for detecting a computer virus and other malicious code.

BRIEF DESCRIPTION OF THE DRAWINGS

These and other more detailed and specific objects and features of the present invention are more fully disclosed in the following specification, reference being had to the accompany drawings, in which.

DETAILED DESCRIPTION OF EMBODIMENTS OF THE INVENTION

Malicious code typically infects a host file by attaching or altering code at or near an "entry point" of the file. An entry point is any instruction or set of instructions in the file, a pointer to an instruction or set of instructions, or other data in the file that malicious code can modify to gain control of the computer system at which the file is located. An entry point is typically identified by an offset from some arbitrary point in the file. Certain entry points are located at the beginning of a file or region and, therefore, are always invoked when the file or region is executed. For example, an entry point can be the first instruction executed when the host file is executed or when a function within the file is called. Other possible entry points are single instructions deep within the file that can be modified by malicious code. For example, the entry point can be a CALL or JMP instruction that is modified to invoke the malicious code. Once malicious code seizes control of the computer system through the entry point, the malicious code typically infects other files on the system and/or other systems networked with the host system.

Although the present invention can be applied to detect any type of malicious code, an embodiment of the invention is described in the context of detecting a computer virus. However, persons skilled in the art can appreciate that the invention can be used to detect any type of malicious code, such as computer worms, that is susceptible to the heuristic described herein.

Figure 1:
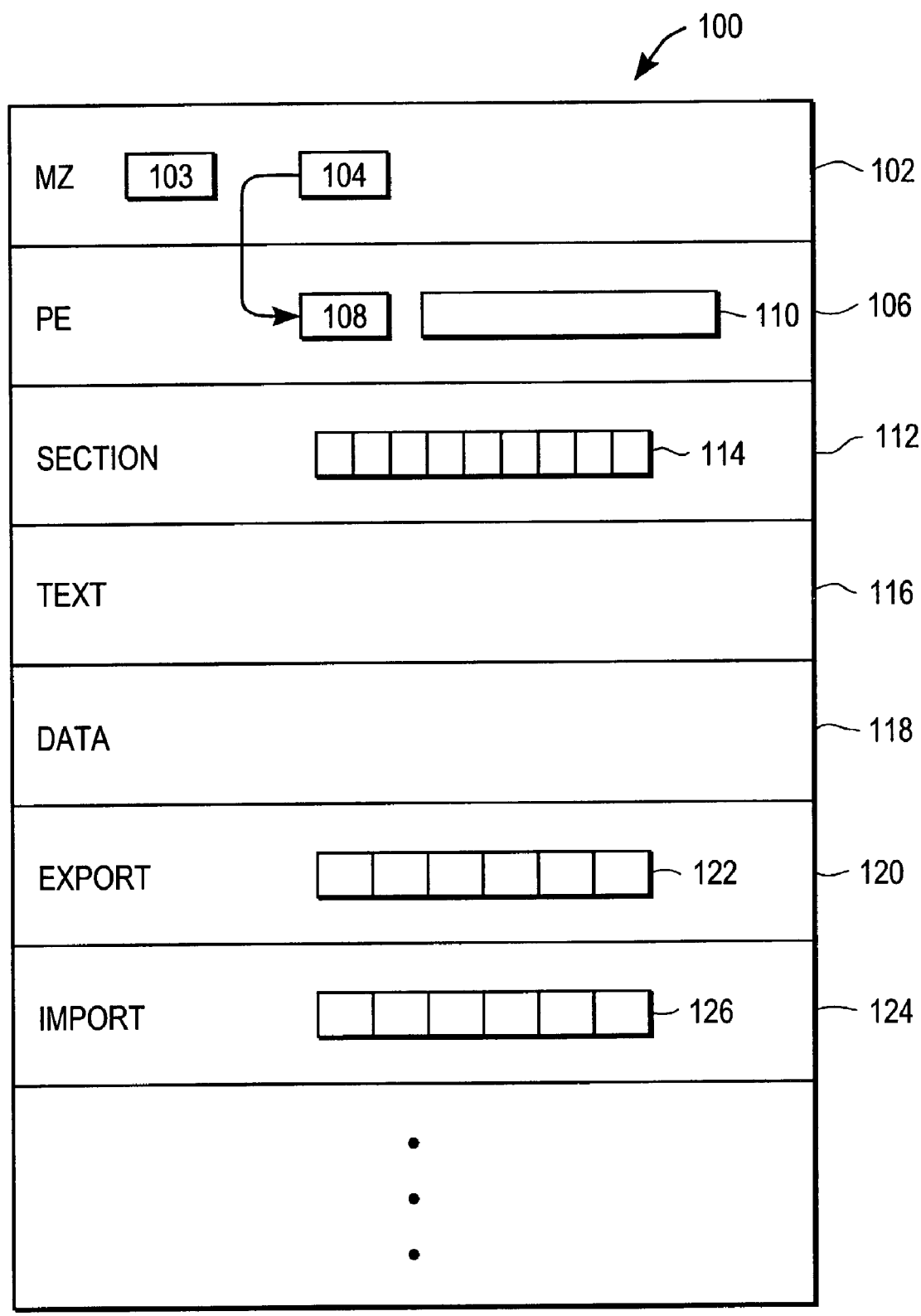
FIG. 1 is a high-level block diagram illustrating a potential infected host file 100 having multiple entry points.

FIG. 1 is a high-level block diagram of a potential virus host file 100 having multiple entry points that can be infected by a virus as described above. In the example illustrated by FIG. 1, the executable file 100 is a Win32 portable executable (PE) file intended for use with a MICROSOFT WINDOWS-based operating system (OS), such as WINDOWS ME, WINDOWS NT, WINDOWS 2000, or WINDOWS XP. Typically, the illustrated file 100 is of the type .EXE, indicating that the file is an executable file, or .DLL, indicating that the file is a dynamic link library (DLL). However, the present invention can be used with any file, and is not limited to only the type of file 100 illustrated in FIG. 1. APPLE MACINTOSH and LINUX files, for example, share many similarities with Win32 files, and the present invention applies equally to such files.

The file 100 is divided into sections containing either code or data and aligned along four-kilobyte (kB) boundaries. The MS-DOS section 102 contains the MS-DOS header and is marked by the characters "MZ." This section 102 contains a small executable program 103 designed to display an error message if the executable file is run in an unsupported OS (e.g., MS-DOS). This program 103 is an entry point for the file 100. The MS-DOS section 102 also contains a field 104 holding the relative offset to the start 108 of the PE header section 106. This field 104 is another entry point for the file 100.

The PE header section 106 is marked by the characters "PE" and holds a data structure 110 containing basic information about the file 100. The data structure 110 holds many data fields describing various aspects of the file 100.

Section 112 holds the section table 114, which contains information about each section in the file 100, including the section's type, size, and location in the file 100. For example, entries in the section table 114 indicate whether a section holds code or data, and whether the section is readable, writeable, and/or executable. Each entry in the section table 114 describes a section that may have a single entry point, multiple entry points, or no entry points.

The text section 116 holds executable code produced by the compiler or assembler. The data section 118 holds global and static variables that are initialized at compile time. There can be more than one text section 116 and/or more than one data 118 in the file 100.

The export section 120 contains an export table 122 that identifies functions exported by the file 100 for use by other programs. An EXE file might not export any functions, while DLL files typically export some functions. The export table 122 holds the function names, entry point addresses, and export ordinal values for the exported functions. The entry point addresses typically point to other sections in the file 100. Each exported function listed in the export table 122 is an entry point into the file 100.

The import section 124 has an import table 126 that identifies functions that are imported by the file 100. Each entry in the import table 126 identifies the external DLL and the imported function by name. When code in the text section 116 calls a function in another module, such as an external DLL file, the call instruction transfers control to a JMP instruction also in the text section 116. The JMP instruction, in turn, directs the call to a location within the import table 126. Both the JMP instruction and the entries in the import table 126 represent entry points into the file 100.

To operate, a computer virus typically needs to call certain system API functions, such as FileOpen( ) and FileDelete( ). Unlike the file 100 itself, a typical virus cannot use the import table 126 to call these API functions, because the virus infects the file 100 after the import table 126 is made. Accordingly, viruses often solve this problem by searching the headers of certain system DLLs—such as the KERNEL32. DLL in WINDOWS95—to obtain the addresses for the API functions that the virus needs to call. This action is suspicious because a normal file 100 does not need to access these non-normal locations in the memory because the file 100 has an import table 126. As used herein, a "non-normal" memory location is any part of the memory that a normal application does not typically access, such as headers and other sections that do not contain executable code. Accordingly, access to that memory location is suspicious as indicating the presence of malicious code. As used herein, "access" refers to any read or write operations to a memory. The present invention uses this concept to provide a heuristic for detecting file infector viruses and any other malicious code that accesses suspicious locations in the memory.

Figure 2:
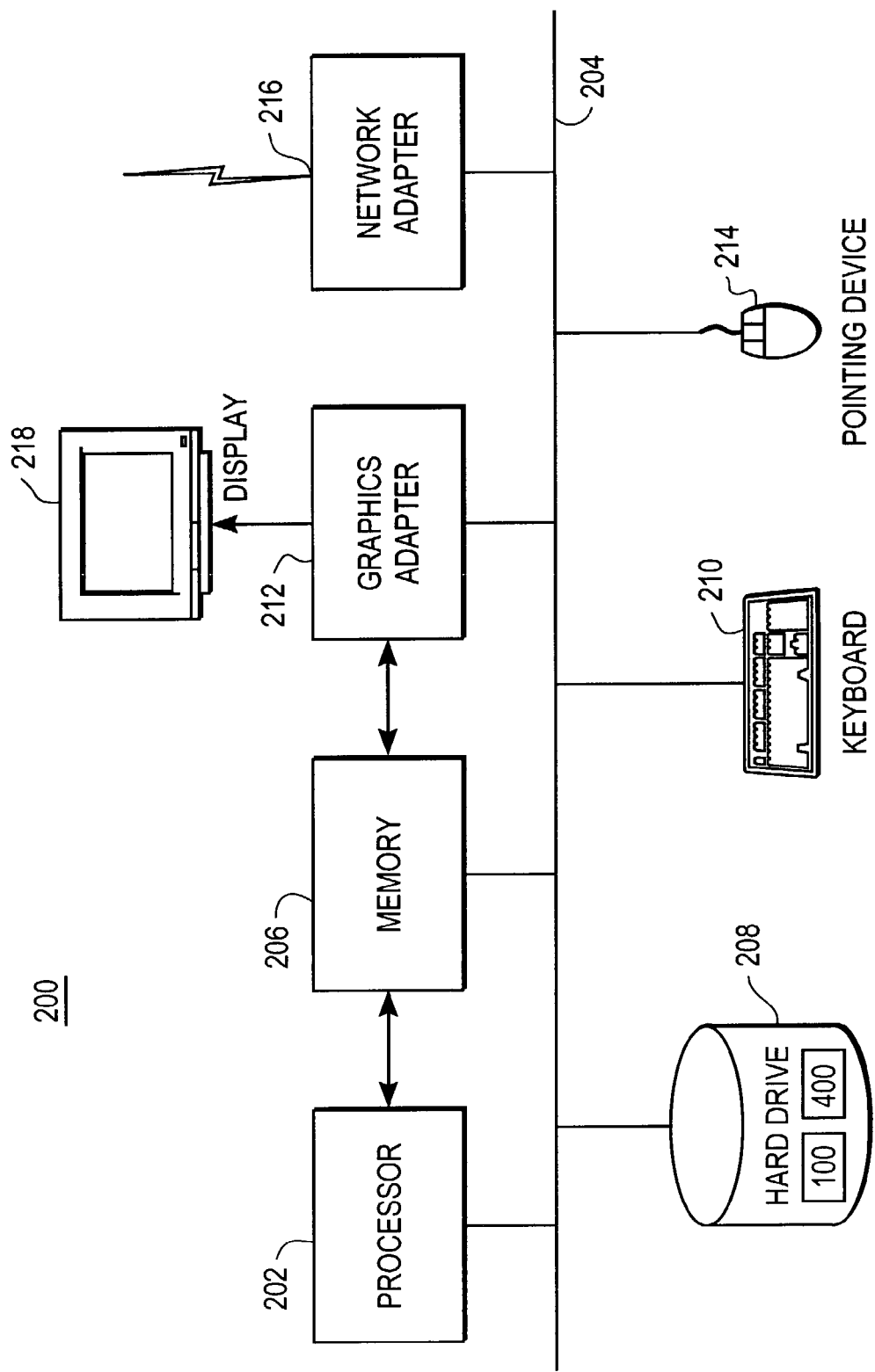
FIG. 2 is a high-level block diagram illustrating a computer system 200 for executing a virus detection system (VDS) 400.

FIG. 2 is a high-level block diagram of a computer system 200 for storing and executing the host file 100 and a virus detection system (VDS) 400. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor, such as an INTEL x86, a SUN MICROSYSTEMS SPARC, or a POWERPC-compatible CPU. As is known in the art, the processor 202 has multiple registers that are used to hold instructions, data, addresses, and other information. The storage device 208 may be any device capable of holding data, like a hard drive, compact disk read-only memory (CD-ROM), DVD, or a solid-state memory device. As is known in the art, the storage device 208 typically holds multiple files of different types, including potential virus host files like that described by FIG. 1. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, the computer system 200 is adapted to execute computer program modules for providing functionality described herein. As used herein, the term "module" refers to computer program logic and/or any hardware or circuitry utilized to provide the specified functionality. Thus, a module can be implemented in hardware, firmware, software, or any combination thereof. Preferably, program modules providing the functionality of the VDS 400 are stored on the storage device 208.

Figure 3:
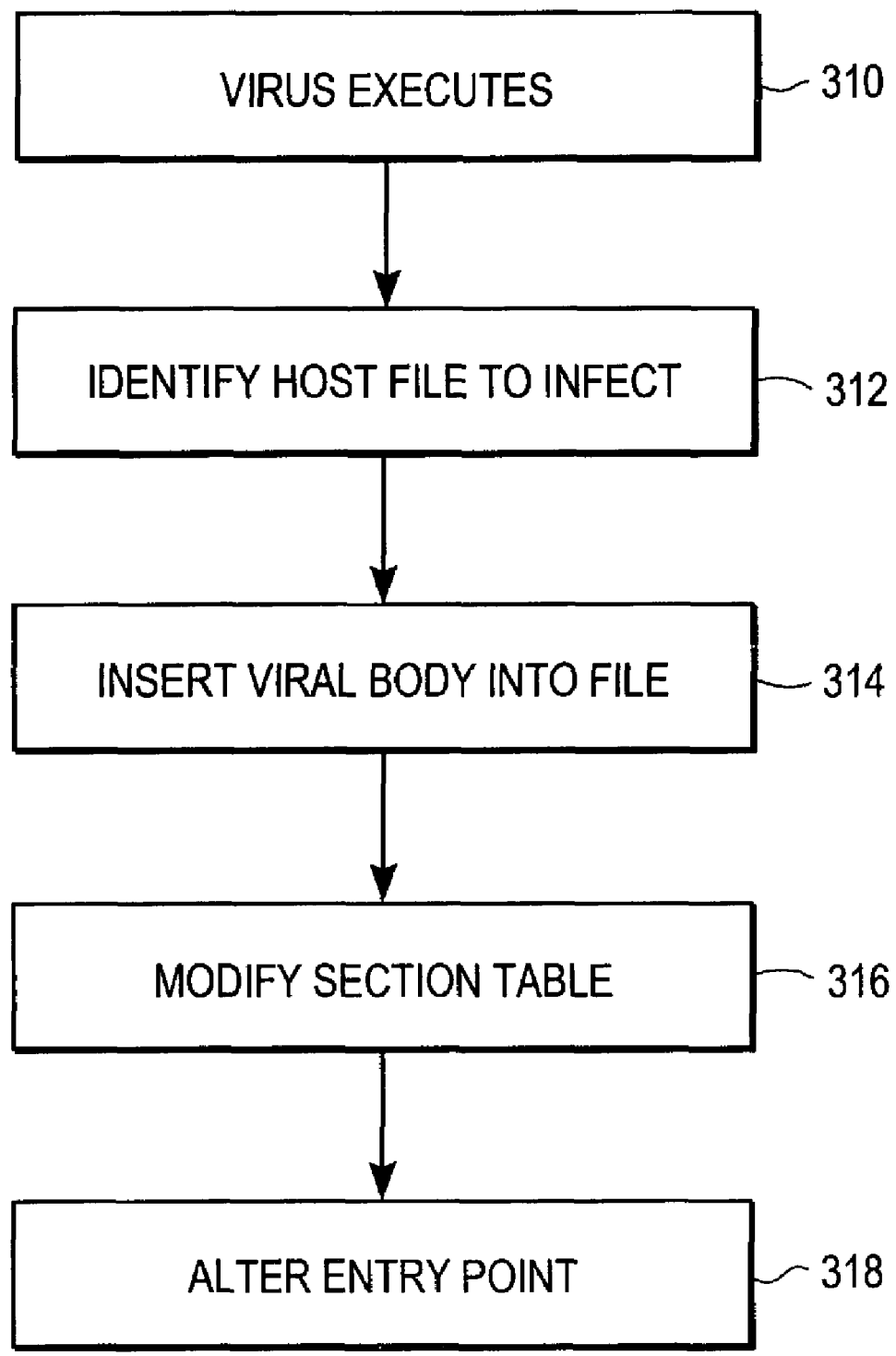
FIG. 3 is a flowchart illustrating the steps performed by a typical virus when infecting a host file 100.

FIG. 3 is a flowchart illustrating steps performed by a typical virus when infecting the host file. The illustrated steps are merely an example of a viral infection and are not representative of any particular virus. Initially, the virus executes 310 on the computer system 200. The virus may execute, for example, when the computer system 200 executes or calls a function in a previously infected file.

The virus identifies 312 a new host file 100 to infect. For example, the virus may search for files matching the string "*.EXE" to identify new host file candidates. The virus then filters the candidate files to identify 312 a particular new host file 100. The files may be filtered based for example on the files' sizes, names, types, and/or whether the files are already infected by the virus.

The virus inserts 314 its viral code into the new host file 100. For example, the virus can append the viral body to the slack space at the end of a section or put the viral body within an entirely new section. During this step 314, the virus uses one or more techniques to modify its current viral code to produce new viral code, which it then inserts into the file 100. The techniques the virus can use to modify its code include inserting and/or removing jump ("JMP") and no-operation ("NOP") instructions; substituting varying sets of equivalent instructions for performing certain tasks, such as register subtractions or zeroing; and substituting the registers used by certain instructions.

The virus typically modifies 316 the section table 114 in the host file 100 to account for the added viral code. For example, the virus may change the size entry in the section table 114 to account for the added viral code. Likewise, the virus may add entries for new sections added by the virus. If necessary, the virus may mark an infected section as executable and/or place a value in a little-used field to discreetly mark the file 100 as infected and prevent the virus from re-infecting the file 100.

In addition, the virus typically also alters 318 an entry point of the host file 100 to call the viral code. The virus may accomplish this step by, for example, overwriting the value in the field 104 holding the relative offset to the start 108 of the PE section 106, with the relative offset to virus code stored elsewhere in the file. Alternatively, the virus can modify entries in the export table 122 to point to sections of virus code instead of the exported functions. A virus can also modify the destination of an existing JMP or CALL instruction anywhere in the file 100 to point to the location of viral code elsewhere in the file 100, effectively turning the modified instruction into a new entry point for the virus.

A particularly sophisticated virus can use very complex techniques for infecting the host file 100 that differ in some respects from the ones described above. For example, one sophisticated virus includes a disassembly engine in its viral body and uses it to disassemble the host file 100 into its smallest elements. Then, the virus infects the dissembled host file 100 by moving code blocks to clear space for the viral code, inserting its modified viral body, regenerating code and data references, including relocation information, and then rebuilding the file 100. Another sophisticated virus detects whether a compiler is present on the host computer system 200. If a compiler is present, the virus uses it to recompile a slightly modified version of the virus's source code and thereby generate a completely new viral body. Then, the virus inserts the new viral body into the host file 100. Other viruses can use techniques in addition to, or instead of, the ones described herein to modify the viral bodies and insert the bodies into host files.

Figure 4:
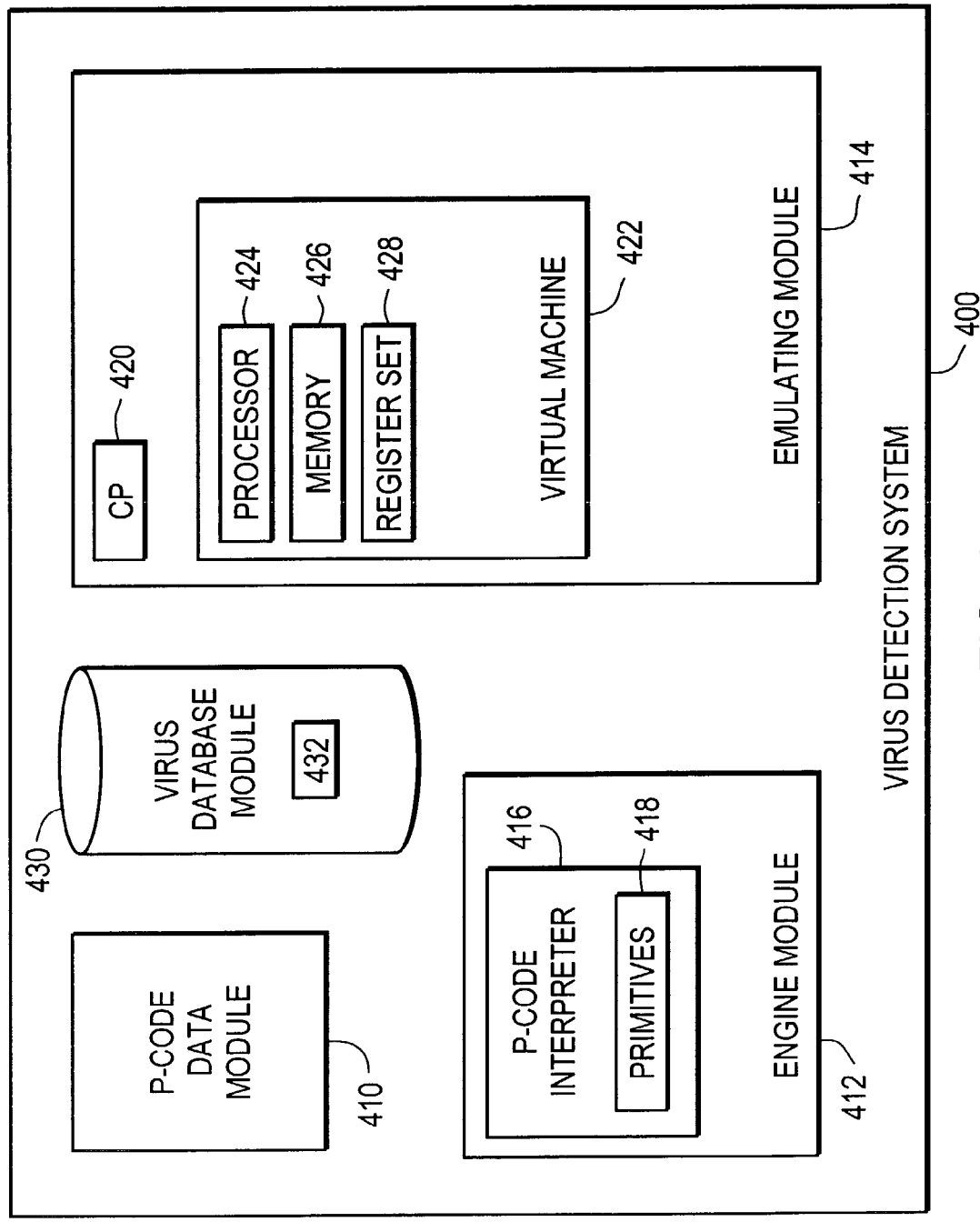
FIG. 4 is a high-level block diagram illustrating modules of the VDS 400 according to an embodiment of the present invention.

FIG. 4 is a high-level block diagram illustrating modules of the VDS 400 for detecting the presence of a virus in a host file 100 or elsewhere in the computer system 200 according to an embodiment of the present invention. FIG. 4 illustrates only the modules of the VDS 400 useful for describing the present invention, and it will be understood that an embodiment of the present invention may include other modules not described herein. In addition, embodiments of the present invention may lack modules described herein and/or distribute the described functionality among the modules in a manner different than described herein.

The VDS 400 includes a P-code data module 410, an engine module 412, an emulating module 414, and a virus database module 430. The P-code data module 410 preferably holds P-code instruction modules for controlling the operation of the VDS 400 to detect the presence of a virus. As used herein, "P-code" refers to program code for providing data-driven functionality to the VDS 400. Preferably, a virus researcher creates the P-code instructions in the data module 410 by writing instructions in any computer language and then compiling the instructions into P-code. In addition, the functionality of the P-code can be replaced by other data-driven techniques. For example, the program code can be stored in a representation other than P-code or a state machine can be utilized in combination with, or as an alternative to, the P-code to provide deterministic data-driven virus detection.

One embodiment of the present invention uses data-driven techniques to control the operation of the VDS 400 because such techniques allow the functionality of the VDS to be updated by updating the P-code and/or other data. For example, the VDS 400 can be updated to detect new viruses by updating the P-code instead of the other modules. Accordingly, the use of data-driven techniques simplifies the task of updating thousands or millions of VDSs 400 that are installed on computer systems "in the field." However, alternate embodiments of the present invention implement the described functionality through non-data-driven techniques.

The engine module 412 preferably controls the operation of the VDS 400 in response to the P-code in the P-code data module 410. The engine 412 preferably contains a P-code interpreter 416 for interpreting the P-code, which in turn controls the operation of the engine 412. In alternative embodiments where the data module 410 holds instructions in a format other than P-code, the engine 414 is equipped with a module for interpreting or compiling the instructions in the relevant format.

The P-code interpreter 416 preferably includes special P-code function calls called "primitives" 418. The primitives 418 can be, for example, written in P-code or a native language, and/or integrated into the interpreter 416 itself. Primitives 418 are essentially functions useful for examining the host file 100 and virtual machine 422 that can be called by other P-code. For example, the primitives 418 perform functions such as opening files for reading, closing files, zeroing out memory locations, truncating memory locations, locating exports in the file, determining the type of the file, and finding the offset of the start of a function. The functions performed by the primitives 418 can vary depending upon the computer or operating system in which the VDS 400 is being used. For example, different primitives may be utilized in a computer system running the MACINTOSH operating system than in a computer system running a version of the WINDOWS operating system. In an alternative embodiment, some or all of the primitives can be stored in the P-code data module 410 instead of the interpreter 416.

The emulating module 414 is preferably adapted to execute computer program instructions in the host file 100 in a virtual machine 422 under the direction of the engine module 412. The emulating module 414 includes a control program (CP) module 420 for setting up a virtual machine 422 having a virtual processor 424, a virtual memory 426, and a set of virtual registers 428 (typically part of the virtual processor). The virtual machine 422 emulates a 32-bit MICROSOFT WINDOWS environment, an APPLE MACINTOSH environment, or any other hardware and/or software environment for which emulation is desired. The virtual machine 422 uses the virtual processor 424 to execute the instructions in the virtual memory 426 in isolation from the actual hardware and software on the computer system 200. Therefore, the malicious code executed by the emulating module 414 cannot contaminate the computer system 200.

Figure 5:
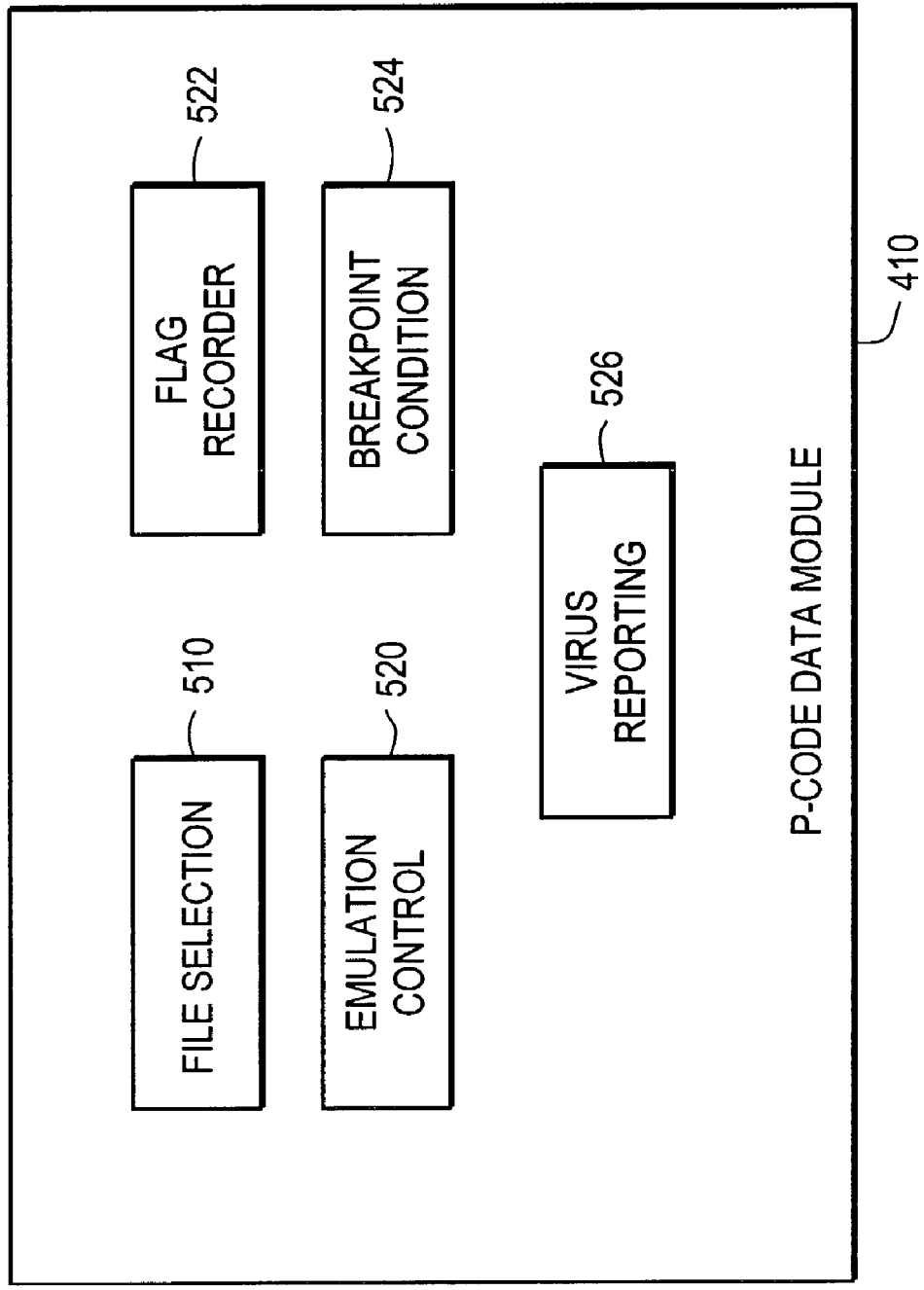
FIG. 5 is a high-level block diagram illustrating a more detailed view of the P-code data module 410 in the VDS 400.

FIG. 5 is a high-level block diagram illustrating a more detailed view of the P-code data module 410. Embodiments of the P-code data module 410 may contain additional or different modules than those described with respect to FIG. 5 and the functionality may be distributed among the modules in a different manner than is described herein.

A file selection module 510 preferably contains P-code for selecting a potential host file 100 on the computer system 200 to examine for the presence of a virus. In general, the file selection module 510 preferably filters the files on the computer system 200 to select only files that are susceptible to infection by a virus. In one embodiment, the file selection module 510 performs one or more tests on each file, and only those files that pass each test are designated "susceptible to infection by a virus." The tests can include, for example, determining whether the file contains executable instructions (e.g., whether the file has a ".EXE" or ".DLL" extension), whether the file is a PE file, whether the file contains a marker that is consistent with infection by a known virus, whether the size of the file is suspicious, and whether the internal characteristics of the file indicate a possible viral infection.

In one embodiment, other modules in the VDS 400 are adapted to identify files on the computer system 200 and use the file selection module 510 to determine whether the file is susceptible to infection. For example, the other modules may be configured to detect when a file 100 on the storage device 208 is accessed and then activate the file selection module 510 to process the file 100. In another example, the other modules may be configured to search recursively for files on the storage device 208 and utilize the file selection module 510 to examine each encountered file 100. In another embodiment, the functionality described in these two examples is provided by the file selection module 510 itself.

The P-code data module 410 preferably includes an emulation control module 520. This module 520 preferably contains code for identifying and selecting potential virus entry points in the file 100 and emulating instructions in the file 100 at each selected point. Although one embodiment of the emulation control module 520 selects only certain locations in the file 100 as potential entry points, another embodiment of the module 520 treats every instruction in the file 100, or every instruction within certain regions of the file 100, as potential entry points. The emulation control module 520 accesses the virus database module 430 to determine the parameters for the emulations and interacts with the control program 420 in the emulating module 414 to perform the emulations according to the parameters. In one embodiment, the emulation control module 520 holds the emulation parameters instead of the virus database 430.

The P-code data module 410 also preferably includes a flag recorder module 522. This module 522 preferably contains code for setting one or more flags in response to the access of suspicious address ranges in the memory 426 by the emulated program. The address range or ranges to track are preferably stored in the virus database 430, although other embodiments of the present invention may use other techniques to specify the address ranges. The VDS 400 preferably stores the flags in the emulation module 414 or another location in the computer system 200 where the flags are accessible to the modules in the VDS 400. Depending on the desired heuristic, the flag recorder module 522 may be adapted to set a separate flag associated with different suspicious memory address ranges.

The P-code data module 410 also preferably includes a breakpoint condition module 524. This module 524 preferably specifies breakpoints and other stopping conditions for the emulation. Preferably, the emulation control module 520 uses the breakpoint condition module 524 to stop the emulation at certain points. In one embodiment, the breakpoint condition module 524 specifies a number of instructions that should be emulated before stopping. Preferably, the breakpoints are configured to stop emulation after relatively few instructions. For example, in one embodiment a breakpoint stops emulation after 50 to 500 instructions. In contrast, typical emulation-based virus detection software may emulate over one million instructions before reaching a breakpoint. In another embodiment, the breakpoint condition module 524 specifies a virtual machine state at which emulation should stop. In yet another embodiment, the module 524 specifies a combination of factors for determining whether to stop emulation. For example, the breakpoint condition module 524 can specify that emulation should stop if one or more flags have been set by the flag recorder module 522. In another example, the breakpoint condition module 524 can specify that a breakpoint should occur every 100 instructions, until the total number of emulated instructions exceeds a specified maximum. The breakpoint condition module 524 may also store separate breakpoint conditions for certain host files and/or viruses and also a default breakpoint condition.

The P-code data module 410 also preferably includes a virus reporting module 526 storing code for detecting the presence of a virus in the file 100. Preferably, the virus reporting module 526 whether one or more flags have been set by the flag recorder module 522. If the virus reporting module 526 determines that one or more flags were set, the module 526 preferably reports a probable virus detection to the VDS 400. In response, other modules in the VDS 400 preferably perform actions such as notifying the computer user of the virus, quarantining the file 100, attempting to repair the infected file 100 and/or computer system, and performing additional heuristics. If the virus reporting module 526 determines that no flags or an insufficient number of flags have been set, the module preferably reports this result to the VDS 400.

Figure 6:
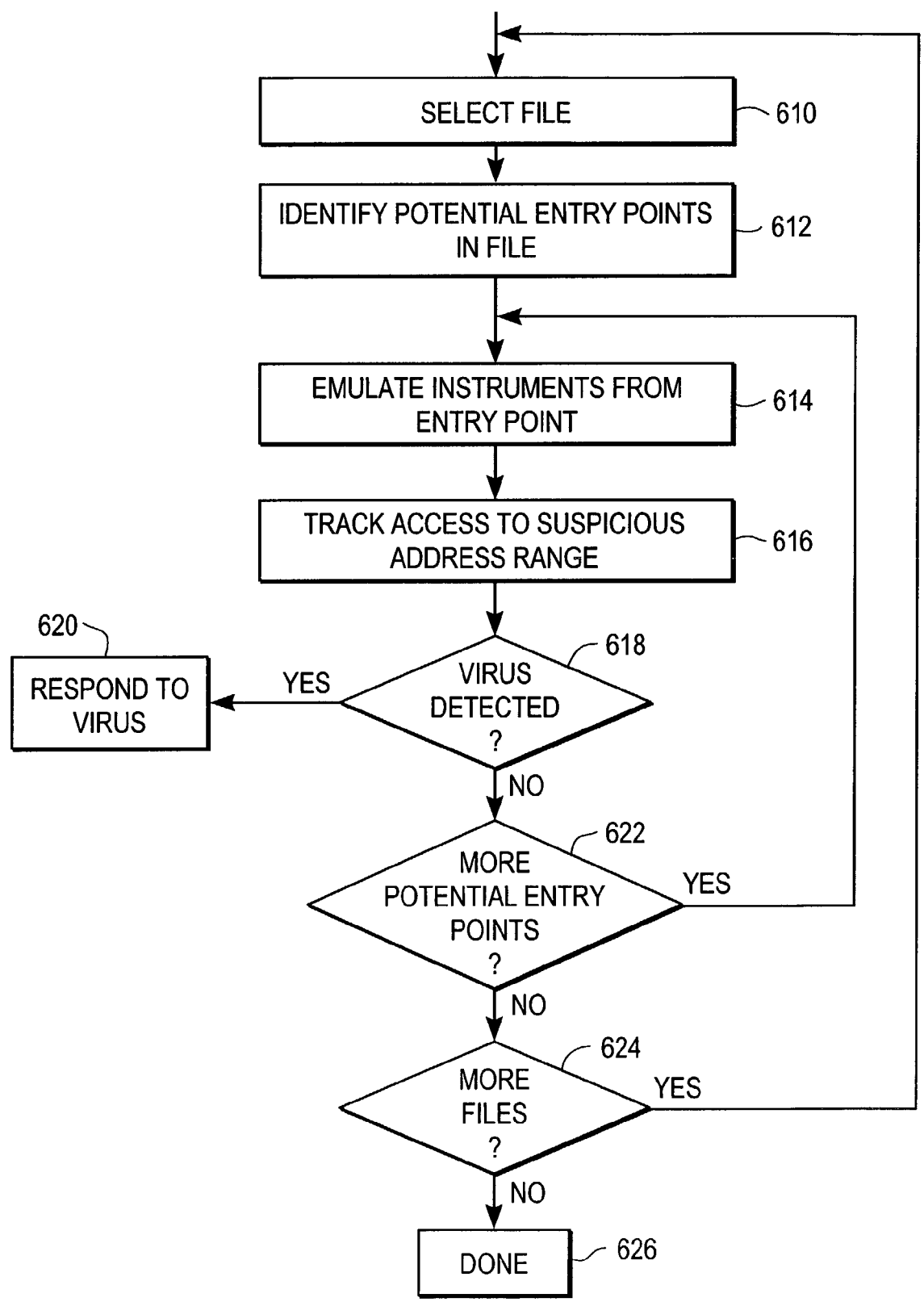
FIG. 6 is a flowchart illustrating the operation of the VDS 400 to detect the presence of malicious code according to an embodiment of the present invention.

FIG. 6 is a flowchart illustrating the operation of the VDS 400 to detect the presence of a virus according to an embodiment of the present invention. Preferably, P-code for enabling the VDS 400 to operate in the described manner is stored in the P-code data module 410. Since the operation is data-driven, other embodiments of the present invention may perform different or additional steps than those described herein. In addition, the steps may be performed in different orders.

The VDS 400 examines the files on the computer system 200 to identify those files that are susceptible to infection by a virus. Preferably, the VDS 400 selects 610 a single file 100 for further examination. Alternatively, the VDS 400 receives a reference to a file from another module executing on the computer system 200 and subjects this file 100 to further examination.

The VDS 400 examines the selected file 100 to identify 612 potential entry points for a virus. As described above, there are many locations in the file 100 that viruses can exploit as entry points. The VDS 400 selects one of the entry points and emulates 614 the instructions at that entry point according to the specified emulation parameters. While emulating 614 the selected file 100, the VDS 400 tracks 616 access to suspicious address ranges in the virtual memory 426. The VDS 400 continues to emulate 614 the instructions and track 616 page access until the emulation reaches a breakpoint. The process of emulating the instructions in the file and tracking page access is referred to herein as "tracing" or "micro-tracing."

If 618 the VDS 400 detects a virus, as indicated by one or more flags having been set by the flag recorder module 522, the VDS 400 preferably responds 620 to the virus by notifying the computer user, cleaning the file 100, or continuing to run additional heuristics. Depending upon the breakpoint, the VDS 400 may resume the micro-trace of the entry point if it does not detect a virus. For example, the VDS 400 may resume the micro-trace if it has emulated only 100 instructions and the breakpoint specifies that a break should occur every 100 instructions until a maximum of 1000 instructions are emulated.

If the VDS 400 finishes emulating 614 from entry point and it does not detect a virus, the VDS 400 determines 622 whether there are more potential entry points in the selected file 100 to micro-trace. If so, the VDS 400 begins 614 a new micro-trace at the next potential entry point. When the VDS 400 has micro-traced all of the potential entry points without detecting a virus, it determines 624 whether there are more files to check for viruses. If there are more files, the VDS 400 selects another file and repeats the virus detection process described above. If there are no more files, the VDS 400 completes 626 operation.

In sum, an infected program is likely to attempt to access suspicious, non-normal address ranges in the memory. The present invention uses this property as a dynamic heuristic to detect the presence of such viruses by micro-tracing portions of potential virus host files and tracking their access to certain pages in the virtual memory. As a result, the present invention can detect viruses that may be undetectable with other means, such as pattern matching and other static heuristic techniques.

The above description is included to illustrate the operation of various embodiments of the invention and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for detecting malicious code in a host file, the method comprising the steps of:
   emulating the host file in a virtual machine having a virtual memory;
   tracking access of the virtual memory by the host file;
   detecting potential malicious code based at least in part on whether the host file accessed the virtual memory within a non-normal address range, wherein the non-normal address range of the virtual memory includes a portion of the virtual memory containing an address for an API function; and
   reporting whether potential malicious code in the host file was detected based at least in part on the detecting.

2. The method of claim 1, wherein detecting the potential malicious code comprises the steps of:
   setting a flag responsive to the access of the virtual memory within the non-normal address range; and
   declaring the potential malicious code based on the status of the flag.

3. The method of claim 1, wherein emulating the host file comprises the steps of:
   identifying a potential entry point for the malicious code in the host file; and
   emulating instructions in the host file around the entry point.

4. The method of claim 1, wherein the non-normal address range is a section of a file other than a section containing executable code.

5. The method of claim 1, wherein the non-normal address range is a header portion of a dynamically linked library.

6. The method of claim 5, wherein the dynamically linked library is KERNLL32.DLL.

7. The method of claim 1, wherein the access of the virtual memory is a read operation.

8. The method of claim 1, wherein the host file is in the PE (portable executable) format.

9. A computer program product comprising a computer-readable medium containing computer program code for detecting malicious code in a host file, the computer program code comprising instructions for performing the steps of:

emulating the host file in a virtual machine having a virtual memory;

tracking access of the virtual memory by the host file;

detecting potential malicious code based at least in part on whether the host file accessed the virtual memory within a non-normal address range, wherein the non-normal address range of the virtual memory includes a portion of the virtual memory containing an address for an API function; and reporting whether potential malicious code in the host file was detected based at least in part on the detecting.

10. The computer program product of claim 9, wherein detecting the potential malicious code comprises the steps of:

setting a flag based at least on part to the access of the virtual memory within the non-normal address range; and declaring the potential malicious code based on the status of the flag.

11. The computer program product of claim 9, wherein emulating the host file comprises the steps of:

identifying a potential entry point for the malicious code in the host file; and emulating instructions in the host file around the entry point.

12. The computer program product of claim 9, wherein the non-normal address range is a section of a file other than a section containing executable code.

13. The computer program product of claim 9, wherein the non-normal address range is a header portion of a dynamically linked library.

14. The computer program product of claim 13, wherein the dynamically linked library is KERNLL32.DLL.

15. The computer program product of claim 9, wherein the access of the virtual memory is a read operation.

16. The computer program product of claim 9, wherein the host file is in the PE (portable executable) format.

17. A computer program product comprising a computer-readable storage medium containing computer program code for detecting malicious code in a host file, the computer program code comprising:

an emulating module for emulating the host file in a virtual machine having a virtual memory;

a flag recording module adapted to set a flag based at least in part on whether the host file accessed a non-normal address range of the virtual memory, wherein the non-normal address range of the virtual memory includes a portion of the virtual memory containing an address for an API function; and a virus reporting module adapted to declare potential malicious code based on whether the flag is set.

18. The computer program product of claim 17, further comprising:

a virus database module for storing at least one address range of the virtual memory defined as non-normal.

19. The computer program product of claim 17, wherein the virus reporting module declares potential malicious code based on the flag in combination with additional heuristics.

20. The computer program product of claim 17, wherein the non-normal address range is a section of a file other than a section containing executable code.

21. The computer program product of claim 17, wherein the non-normal address range is a header portion of a dynamically linked library.

22. The computer program product of claim 17, wherein the host file is in the PE (portable executable) format.

23. A virus detection system for detecting malicious code in a host file, the system comprising:

a storage medium for storing a plurality of software modules;

a processor for executing the software modules;

an emulating module for emulating the host file in a virtual machine having a virtual memory;

a flag recording module coupled to the emulating module, the flag recording module adapted to set a flag based at least on part on whether the host file accessed a non-normal address range of the virtual memory, wherein the non-normal address range of the virtual memory includes a portion of the virtual memory containing an address for an API function; and a virus reporting module coupled to the flag recording module, the virus reporting module adapted to declare potential malicious code based on whether the flag is set.

24. The virus detection system of claim 23, further comprising:

a virus database module coupled to the flag recording module, the virus database module storing one or more address ranges of the virtual memory defined as non-normal.

25. The virus detection system of claim 23, wherein the virus reporting module declares potential malicious code based on the flag in combination with additional heuristics.

26. The virus detection system of claim 23, wherein the non-normal address range is a section of a file other than a section containing executable code.

27. The virus detection system of claim 23, wherein the non-normal address range is a header portion of a dynamically linked library.

28. The virus detection system of claim 23, wherein the host file is in the PE (portable executable) format.

* * * * *

UNITED STATES PATENT AND TRADEMARK OFFICE
CERTIFICATE OF CORRECTION

PATENT NO. : 7,418,729 B2
APPLICATION NO. : 10/264922
DATED : August 26, 2008
INVENTOR(S) : Peter Szor It is certified that error appears in the above-identified patent and that said Letters Patent is hereby corrected as shown below:

In claim 6, column 10, line 63, please change "KERNLL32.DLL" to --KERNEL32.DLL--.

In claim 14, column 11, line 36, please change "KERNLL32.DLL" to --KERNEL32.DLL--.

Signed and Sealed this

Eleventh Day of November, 2008

JON W. DUDAS
*Director of the United States Patent and Trademark Office*